US012598070B2

(12) United States Patent
Ferenczi et al.

(10) Patent No.: US 12,598,070 B2
(45) Date of Patent: Apr. 7, 2026

(54) MANAGING VERIFIABLE CREDENTIAL LINKAGES USING DECENTRALIZED IDENTITY

(71) Applicant: American Express Travel Related Services Company, Inc., New York, NY (US)

(72) Inventors: Andras L. Ferenczi, Phoenix, AZ (US); Mukund Shankar SimhaRaghu, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 266 days.

(21) Appl. No.: 18/236,739

(22) Filed: Aug. 22, 2023

(65) Prior Publication Data

US 2025/0070973 A1 Feb. 27, 2025

(51) Int. Cl.
*H04L 9/32* (2006.01)
*H04L 9/00* (2022.01)

(52) U.S. Cl.
CPC ............... *H04L 9/321* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 8,024,488 | B2 * | 9/2011 | Salowey | ................. G06F 21/44 |
| | | | | 710/10 |
| 11,025,435 | B2 * | 6/2021 | Li | ........................ H04L 9/3239 |
| 11,218,313 | B1 * | 1/2022 | Raghavan | ............. H04L 9/0643 |
| 2020/0127828 | A1 * | 4/2020 | Liu | ............................ H04L 9/30 |
| 2021/0058382 | A1 * | 2/2021 | Shang | ................... H04L 9/0637 |

* cited by examiner

*Primary Examiner* — Atta Khan
(74) *Attorney, Agent, or Firm* — Thomas | Horstemeyer, LLP

(57) ABSTRACT

Disclosed are various embodiments for managing a graph of decentralized identifiers (DIDs) associated with verifiable credentials (VCs) and verifiable credential linkages or relationships including those denoting linkages amongst verifiable credentials of different users. The DID tree graph can be maintained and managed to ensure that the DIDs and corresponding VCs are accurate and that the linkages or relationships between DIDs and corresponding VCs are still valid. The DID tree graph can be queried to identify DIDs associated with a DID subtree representing an established relationship or linkage between one or more VCs.

20 Claims, 6 Drawing Sheets

100

303 — Receive Query Comprising DID

306 — Identify Graph Subtree Associated With DID

308 — Obtain Documents?

309 — Generate Subtree Presentation

312 — Transmit Subtree Presentation to Verifier

121

MANAGING VERIFIABLE CREDENTIAL LINKAGES USING DECENTRALIZED IDENTITY

BACKGROUND

Users often are required to verify characteristics about themselves when requesting services. For example, a user may need to verify characteristics about their identity, such as their age or qualifications, when requesting services from an organization. To do so, a user can be provided a verifiable credential that contains information about the individual person. However, there are no current constructs that allow for the user to link or establish a relationship with another user, where this relationship is defined in a verifiable credential of the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
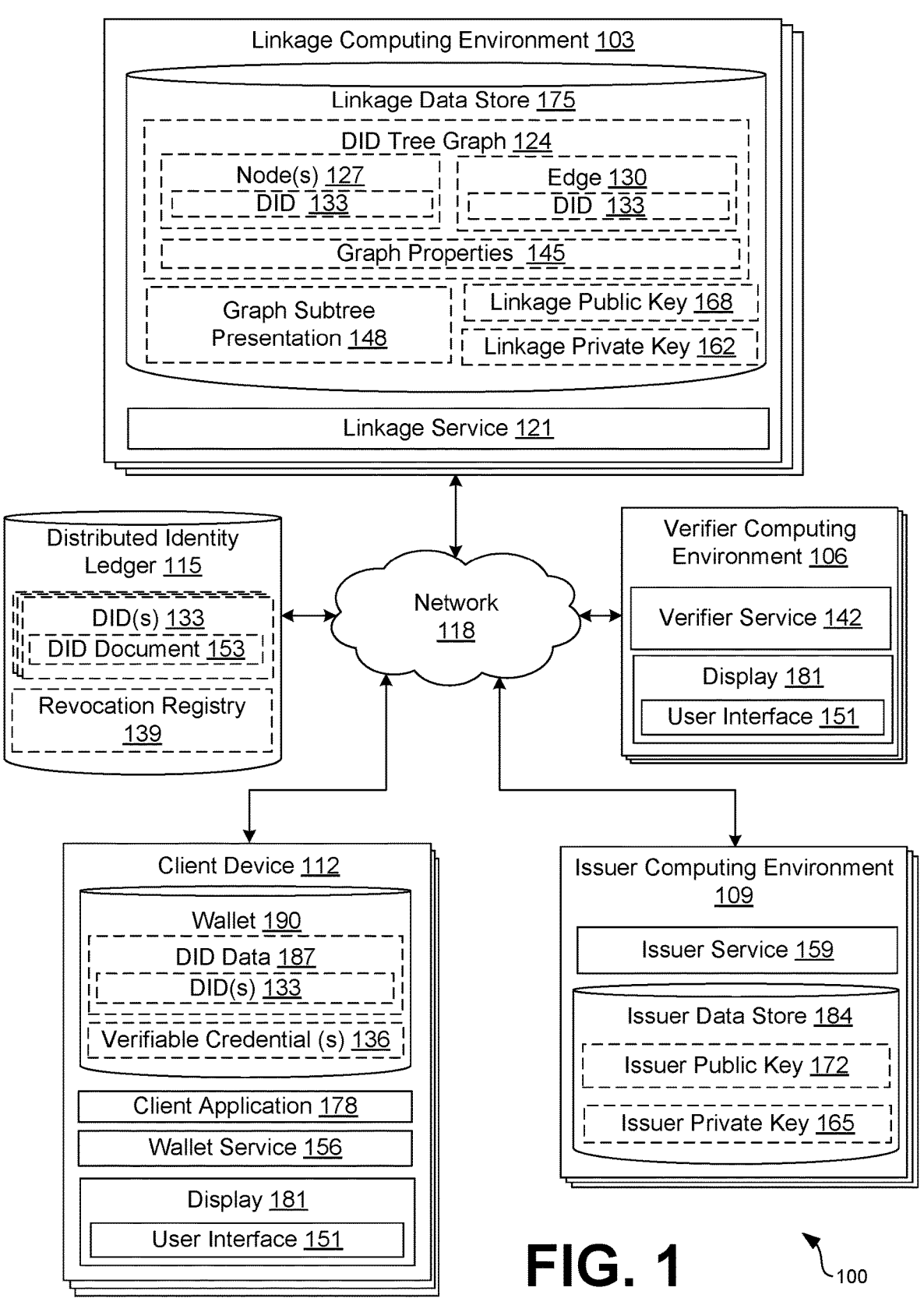
FIG. 1 is a drawing of a network environment according to various embodiments of the present disclosure.

Disclosed are various approaches for managing a graph of decentralized identifiers (DIDs) associated with verifiable credentials (VCs) and verifiable credential linkages or relationships including those denoting linkages amongst verifiable credentials of different users. According to various examples, a DID corresponds to an identifier that enables verifiable, decentralized digital identity of a subject (e.g., person, organization, thing, etc.). For example, a DID can be used to represent the identity of a user. In various examples, a DID can correspond to an address to a DID document that includes information associated with the subject. In various examples, a verifiable credential corresponds to a digital credential used to identify an attribute (e.g., qualification, component, authority, achievement, personally quality, etc.) associated with the credential holder. For example, the verifiable credential can be associated with a user by being linked with and/or otherwise associated with a DID of the user. According to various examples, the present disclosure enable linkages between verifiable credentials of entities, such that one entity can define a relationship between VCs associated with one user or with another user, including the delegation of an authority or right to perform some function/activity to another entity.

Non-limiting examples of delegation of rights can involve power of attorney relationships, where one entity (delegator) delegates an authority to act in one or more legal or financial matters to another entity (delegatee), among others. Another non-limiting example is a parent-child relationship, where the authority to act on behalf of a minor child is bestowed upon a parent and is reflected in the respective verifiable credentials of the parent and child entities. In a similar example, a guardian or conservator could be provided with the authority to act on behalf of a ward, where the ability to act on behalf of the ward is provided by a third-party (e.g., a judge) and is reflected in the respective verifiable credentials of the guardian or conservator and the ward. In accordance with various embodiments, a graph of DIDs associated with VCs and linkages or relationships of VCs and representing the delegation of rights (or other type of defined relationship amongst the entities or VCs) can be managed using methods and systems of the present disclosure.

In various examples of the present disclosure, the relationships and linkages between VCs can be represented by a DID tree graph. In various examples, the DID tree graph can be maintained in a graph database (e.g., Neo4j, AWS Neptune, ArangoDB, JanusGraph, Dgraph, etc.). The DID tree graph can be represented by nodes and edges. The nodes correspond to a given DID representing an entity and being associated with a VC. The edges correspond to a DID of a VC that represents a relationship between the DIDs of the nodes a given edge is connecting. In various examples, a VC can be issued to an entity to represent the verification of the relationships between one or more DIDs associated with one or more entities. In some examples, the VC can be associated with a DID subtree of DIDs according to the linkages or relationships. In other examples, the VC can include a claim that defines the DID subtree associated with the linkages or relationships.

In one example, the VCs associated with the DID tree graph can correspond to birth certificates associated with multiple individuals, including parent A, parent B, child A, and child B. For example, a first DID (e.g., node 1) can correspond to parent A and be associated with parent A's birth certificate, a second DID (e.g., node 2) can correspond to parent B and be associated with parent B's birth certificate, a third DID (e.g., node 3) can correspond to child A of parent A and parent B and be associated with the child A's birth certificate, and a fourth DID (e.g., node 4) can correspond to child B of parent A and parent B and be associated with the child B's birth certificate. According to various examples, the relationships between the birth certificates between the parents and the children can be established and managed using the DID tree graph of the present disclosure. For example, for parent A, edges can be generated between node 1 and node 3 as well as node 1 and node 4 to represent the parent-child relationships. The linkages between verifiable credentials of the parent and the children can represent the delegation of an authority or right to perform some function/activity to by the parent on behalf of the child. For example, when registering the children to attend a school, the parent A may be required to present the school with a birth certificate of each child. In this example, parent A can present his or her DID to the school and the school can verify the children's birth certificate and relationship to the presenting parent using the DID tree graph of the present disclosure which manages the relationship between the parents and each of the children and the corresponding VCs (e.g., birth certificates).

In another example, a subtree of the DID tree graph can correspond to a company directory and represent the hierarchy of employees within the organization. The DID tree graph can further represent the delegation of authority between different employees in the organization based at least in part on the relationships and hierarchy of employees. For example, a manager can be delegated the authority to act on behalf of an employee that is managed by the manager, but the employee may not have the authority to act on behalf of the manager. The authority can be represented by the nodes and edges representing the relationships among the employees of the organization in accordance to various examples of the present disclosure.

In various examples, the DID tree graph can be maintained and managed to ensure that the DIDs and corresponding VCs are accurate and that the linkages or relationships between DIDs and corresponding VCs are still valid. In various examples, a linkage service maintaining the DID tree graph can traverse the DID tree graph and determine if a given DID in the DID tree graph is valid based at least in part on a revocation registry. In various examples, the revocation registry is maintained in a distributed ledger and can include a list of DIDs that have been revoked and/or no longer valid. For example, assume two DIDs in the DID tree graph are associated with a husband and a wife and a linkage DID (e.g., edge) is established in the DID tree graph to represent the relationship between the husband and the wife. If the husband and the wife's marriage ends in a divorce, the linkage DID that represents the relationship can be added to the revocation registry to indicate that the relationship is no longer valid. Accordingly, the linkage service can query the revocation registry for each DID in the DID tree list to determine whether a given DID has been revoked. If a DID has been revoked, the linkage service can update the DID tree graph by removing a node or an edge associated with the DID. If a node is removed, the linkage service can also update the DID tree graph to remove any corresponding edges associated with the removed node. Accordingly, when queried by a verifier service for a DID subtree, the linkage service provides an accurate and up to date representation of the DID subtree.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a linkage computing environment 103, a verifier computing environment 106, an issuer computing environment 109, a client device 112, and a distribute identity ledger 115, which can be in data communication with each other via a network 118.

The network 118 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 118 can also include a combination of two or more networks 118. Examples of networks 118 can include the Internet, intranets, extranets, virtual private networks (VPNs), and similar networks.

The linkage computing environment 103, the verifier computing environment 106, and the issuer computing environment 109 can each include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, linkage computing environment 103, the verifier computing environment 106, and the issuer computing environment 109 can each employ a plurality of computing devices that can be arranged in one or more server banks or computer banks or other arrangements. Such computing devices can be located in a single installation or can be distributed among many different geographical locations. For example, the linkage computing environment 103, the verifier computing environment 106, and/or the issuer computing environment 109 can include a plurality of computing devices that together can include a hosted computing resource, a grid computing resource or any other distributed computing arrangement. In some cases, the linkage computing environment 103, the verifier computing environment 106, and/or the issuer computing environment 109 can correspond to an elastic computing resource where the allotted capacity of processing, network, storage, or other computing-related resources can vary over time.

Various applications or other functionality can be executed in the linkage computing environment 103. The components executed on linkage computing environment 103 include a linkage service 121, and other applications, services, processes, systems, engines, or functionality not discussed in detail herein.

The linkage service 121 can be executed to manage and maintain a DID tree graph 124. According to various examples, a DID tree graph 124 represents the relationships and linkages between VCs 136 associated with one or more entities. For example, a DID tree graph 124 can be represented by nodes 127 and edges 130. A node 127 corresponds to a DID 133 representing an entity and being associated with a VC 136 of the entity. An edge corresponds to a DID 133 of a VC 136 that represents a relationship between the DIDs 133 of the nodes 127 that a given edge 130 is connecting.

In various examples, the linkage service 121 maintaining the DID tree graph 124 can traverse the DID tree graph 124 and determine if a given DID 133 in the DID tree graph 124 is valid based at least in part on a revocation registry 139. In various examples, the revocation registry 139 is maintained in the distributed identity ledger 115 and can include a list of DIDs 133 that have been revoked and/or no longer valid. Accordingly, the linkage service 121 can query the revocation registry 139 for each DID 133 (e.g., associated with nodes 127 or edges 130) in the DID tree graph 124 to determine whether a given DID 133 has been revoked. If a DID 133 has been revoked, the linkage service 121 can update the DID tree graph 124 by removing a node 127 associated with the DID 133 and any corresponding edges 130 associated with the removed node 127. In various examples, the DID tree graph 124 is associated with a graph database (e.g., Neo4j, AWS Neptune, ArangoDB, Janus-Graph, Dgraph, etc.).

In various examples, the linkage service 121 can be executed to respond to queries requesting a subtree of the DID tree graph 124 that is associated with a given DID 133. For example, a verifier service 142 executing in the verifier computing environment 106 can send a query to the linkage service 121 requesting information about a portion of the DID tree graph 124 that corresponds to a given DID 133. For example, the verifier service 142 can submit a query including a DID 133 associated with a VC 136 that has been submitted to the verifier service 142 for verification. In various examples, the VC 136 can be issued to represent linkages or relationships between one or more DIDs 133 of the DID tree graph 124. For example, the VC 136 can represent a subtree of the DID tree graph 124.

In response to receiving the query form the verifier service 142, the linkage service 121 can identify the subtree of the DID tree graph 124 associated with the DID 133. In some examples, the DID 133 corresponds to a root DID 133 of the DID tree graph 124 and the verifier service 142 can identify the subtree of the DID tree graph 124 by identifying any nodes 127 and/or edges 130 that descend from the root DID 133 of the DID tree graph 124. In other examples, the DID 133 corresponds to a DID 133 associated with a defined subtree including one more nodes 127 and edges 130 in the DID tree graph 124. For example, the graph properties 145 can include a mapping of the DID 133 to nodes 127 and edges 130 associated with a given subtree of the DID tree graph 124. Accordingly, the linkage service 121 can identify the given subtree based at least in part on the nodes 127 and edges 130 that are mapped to the DID 133 in the graph properties 145.

Upon identifying the DID subtree associated with the queried DID 133, the linkage service 121 can generate a graph subtree presentation 148 and transmit the graph subtree presentation 148 to the verifier service 142 (or other querying entity). In some examples, the graph subtree presentation 148 is generated to convert the properties of the DID tree graph 124 into a format that can be understood and compatible with the requesting entity. In some examples, the graph subtree presentation 148 can comprise an array of DIDs 133 represented by the identified DID subtree. In some examples, the graph subtree presentation 148 can comprise a user interface 151 that includes a visual representation of the DID subtree. In this example, the user interface 151 can include selectable components corresponding to each of the nodes 127 and edges 130 of the graph subtree. Each of the selectable components, upon selection, can provide a DID 133, a DID document 153, and/or a VC document that is represented by the VC of the associated DID 133.

In some examples, the linkage service 121 can obtain a corresponding DID document 153 and/or VC document associated with the DIDs 133 of one or more of the nodes 127 and/or edges 130 of the DID subtree. For example, for one or more of the DIDs 133 in the DID subtree, the linkage service 121 can obtain a corresponding DID document 153 from the distributed identity ledger 115 and include the corresponding DID document 153 in the graph subtree presentation 148.

In various examples, the linkage service 121 can obtain a corresponding VC document associated with the DID 133 of a given node 127. For example, the linkage service 121 can obtain the corresponding DID document 153 and request access to the VC document represented by the VC via interactions with the VCs holder's agent (e.g., wallet service 156). In various examples, the corresponding DID document 153 can comprise a uniform resource locator (URL) or other location address or application programming interface (API) call for communicating with the VC holder's agent thereby allowing the linkage service 121 to request the VC document represented by the VC 136. The linkage service 121 can further include the VC document in the graph subtree presentation 148 in association with the corresponding DID 133. Upon generating the graph subtree presentation 148, the linkage service 121 can transmit the graph subtree presentation 148 to the verifier service 142 (or other querying entity) for verification.

In various examples, the linkage service 121 can be executed to establish relationships between one or more VCs 136. For example, an entity associated with a given DID 133 of a VC 136 can interact with a user interface 151 associated with the linkage service 121 and request to be linked to another DID 133 of another VC 136. The entity can provide the linkage service 121 with the DIDs 133 and, in some examples, the linkage service 121 can confirm with the one or more entities associated with the DIDs 133 that the DIDs are to be linked.

The linkage service 121 can cause a VC 136 associated with the linkage to be issued. The issued VC 136 represents the linkage between the one or more VCs based at least in part on the DIDs 130 of the VCs 136. In some examples, the linkage service 121 can issue the VC 136. In other examples, the linkage service 121 can request an issuer service 159 of a trusted entity to issue the VC 136 representing the linkage and relationship between VCs 136 of one or more entities is based at least in part on the DIDs 133. Upon confirming the relationship between the VCs 136 (or DIDs 133), a VC 136 can be issued by the linkage service 121 or the issuer service 159 of the trusted entity. In various examples, the claims of the issued VC 136 can include a description of the linkage, the graph subtree associated with the linkage, and/or other representation of the linkage. In addition, the VC 136 can be signed with the private key (e.g., linkage private key 162, issuer private key 165) of the issuing entity and the corresponding DID document 153 associated with the DID 130 of the VC 136 can include the corresponding public key (e.g., linkage public key 168, issuer public key 172) of the issuing entity for verification purposes.

In various examples, the linkage service 121 can update the DID tree graph 124 based at least in part on the established linkages. For example, the DID tree graph 124 can be updated to include nodes 127 and/or edges 130 of the related DIDs 133. In addition, the graph properties 145 can be updated to include a mapping of the DID 133 associated with the generated VC 136 and the nodes 127 and/or edges 130 of the DID subtree associated with the VC 136 and established linkages or relationships.

Also, various data is stored in a data store 175 that is accessible to the linkage computing environment 103. The data store 175 can be representative of a plurality of data stores 175, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 175 is associated with the operation of the various applications or functional entities described below. This data can include the DID tree graph 124, a graph subtree presentation 148, a linkage public key 168, a linkage private key 162, and potentially other data.

The DID tree graph 124 is a tree graph representing the linkages or relationships between DIDs 133 associated with VCs 136. The DID tree graph can be represented by nodes 127, edges 130, and graph properties 145. Each node 127 corresponds to a respective DID 133 representing an entity and being associated with a VC 136. Each edge 130 corresponds to a DID 133 of a VC 136 that represents a relationship between the DIDs 133 of the nodes 127 a given edge 130 is connecting. The graph properties 145 can include properties representing each of the nodes 127 and edges 130 of the DID tree graph. For example, the properties can include a DID 133, a date of creation, a date of expiration, a location within the DID tree graph, and/or other information. In some examples, the graph properties 145 can include a mapping of a DID 133 and nodes 127 and edges 130 included in a DID subtree associated with the DID 133 and corresponding VC 136. In various examples, the DID tree graph can be maintained in a graph database (e.g., Neo4j, AWS Neptune, ArangoDB, JanusGraph, Dgraph, etc.). Although illustrated as being part of the linkage data store 175, in some examples, the DID tree graph can be maintained in a graph database that is remote from the linkage computing environment 103.

The graph subtree presentation 148 represents properties of a subtree of the DID tree graph 124 into a format that can be understood and compatible with a requesting entity. In various examples, the graph subtree presentation 148 can include the DIDs 133 of the DID subtree along with the DID documents 153 of the corresponding DIDs 133 and/or the VC documents that are represented by the VCs 136 associated with the corresponding DIDs 133. In some examples, the graph subtree presentation 148 can comprise an array of DIDs 133 represented by the identified DID subtree. In some examples, the graph subtree presentation 148 can comprise a user interface 151 that includes a visual representation of the DID subtree. In this example, the user interface 151 can include selectable components corresponding to each of the nodes 127 and edges 130 of the graph subtree. Each of the selectable components, upon selection, can provide a DID 133, a DID document 153, and/or a VC document that is represented by the VC of the associated DID 133.

The linkage private key 162 and linkage public key 168 can correspond to a public-private key pair controlled by an entity associated with the linkage service 121 and the linkage computing environment 103. The key-pair can be generated using various approaches, such as elliptic curve cryptography (ECC) approaches or using approaches based at least in part on the Rivest-Shamir-Adleman (RSA) algorithm. In various examples, the linkage public key 168 is publicly available. The linkage private key 162 remains stored in the linkage data store 175 and can be used to sign any cryptographic challenges sent to the linkage service 121 for user verification. In addition, the linkage private key 162 can be used to sign VCs 136 issued by the linkage service 121 that represent linkages between one or more DIDs 133 and/or VCs 136.

Various applications or other functionality can be executed in the verifier computing environment 106. The components executed on the verifier computing environment 106 include a verifier service 142, and other applications, services, processes, systems, engines, or functionality not discussed in detail herein.

The verifier service 142 can be executed to verify VCs 136 provided to the verifier service 142 by an entity associated with the VC 136. In various examples, the verifier service 142 can receive a VC 136 from a client application 178 of a client device 112 associated with the entity. The verifier service 142 can verify the VC 136 by checking the distributed identity ledger 115 to ensure the digital signatures of the issuer and holder of the VC 136 are valid and that the credentials have not been revoked. For example, a verifier computing environment 106 may check the distributed identity ledger 115 to authenticate the issuer and holder and check a revocation registry 139 to determine whether the DID 133 associated with the VC 136 is still valid.

When the VC 136 represents a delegated relationship between VCs 136, the verifier service 142 can generate a query identifying a DID 133 associated with the VC 136 and submit the query to the linkage service 121. For example, the DID 133 can be included in the VC 136 that is presented and the verifier service 142 can extract the DID 133 and include the DID 133 in a query that is transmitted to the linkage service 121. In response to the query, the verifier service 142 can obtain a graph subtree presentation 148 from the linkage service 121. According to various examples, the verifier service 142 can traverse the DID tree graph 124 represented in the graph subtree presentation 148 and verify each of the DIDs 133 and VCs 136 associated with the nodes 127 and edges 130 of the DID tree graph 124. For example for each DID 133, the verifier service 142 can obtain the corresponding DID document 153 from the distributed identity ledger 115 to identify the issuer public key 172, the corresponding VC 136, the public key of the entity, and/or other data. In some examples, the corresponding DID document 153 is included in the graph subtree presentation 148. The verifier service 142 can use the data included in the DID document 153 to verify signatures associated with the corresponding VC 136. Accordingly, the verifier service 142 can verify the relationships and linkages of each of the DIDs 133 included in the graph subtree presentation 148 to ultimately verify the delegated relationship or linkages being represented by the initially submitted VC 136.

In various examples, the graph subtree presentation 148 can correspond to a user interface 151 rendered on a display 181 of the verifier computing environment 106. In this example, a verifier entity (not shown) can interact with the user interface 151 to review the corresponding DID subtree of the DID tree graph 124 associated with the DID 133 of the presented VC 136. For example, the user interface 151 can include selectable components corresponding to each of the nodes 127 and edges 130 of the graph subtree. Each of the selectable components, upon selection by the verifier entity, can provide a DID 133, a DID document 153, and/or a VC document that is represented by the VC 136 of the associated DID 133. In some examples, the DID document 153 and/or VC document are obtained by the linkage service 121 included in the graph subtree presentation 148. In other examples, the verifier service 142 obtains the DID document 153 and/or the VC document in response to a user selection of a selectable component of the rendered user interface 151.

In some examples, the verifier service 142 can obtain a corresponding DID document 153 and/or VC document associated with the DIDs 133 of one or more of the nodes 127 and/or edges 130 of the DID subtree. For example, the verifier service 142 can obtain a corresponding DID document 153 from the distributed identity ledger 115. In various examples, the verifier service 142 can obtain a corresponding VC document associated with the DID 133 of a given node 127. For example, the verifier service 142 can obtain the corresponding DID document 153 and request access to the VC document represented by the VC via interactions with the VCs holder's agent (e.g., wallet service 156). In various examples, the corresponding DID document 153 can comprise a uniform resource locator (URL) or other location address or application programming interface (API) call for communicating with the VC holder's agent thereby allowing the verifier service 142 to request the VC document represented by the VC 136.

Various applications or other functionality can be executed in the issuer computing environment 109. The components executed on the issuer computing environment 109 include an issuer service 159, and other applications, services, processes, systems, engines, or functionality not discussed in detail herein.

The issuer service 159 can be executed to issue VCs 136 for a given entity associated with a DID 133. A VC 136 corresponds to a digital credential used to identify an attribute (e.g., qualification, component, authority, achievement, personally quality, etc.) associated with the credential holder. In various examples, the issuer service 159 and the issuer computing environment 109 are associated with a trusted entity or trusted anchor for issuing VCs 136. The issuer service 159 can sign a VC 136 with the issuer private key 165 to represent that the issuer service 159 has confirmed the validity of the attribute represented by the VC 136. In various examples, the issuer service 159 can generate a VC 136 representing a delegated relationship or linkage between different VCs 136. In this example, the issuer service 159 can confirm the relationship between the DIDs associated with the VCs 136 and issue a VC 136 that represented the relationship.

Also, various data is stored in an issuer data store 184 that is accessible to the issuer computing environment 109. The issuer data store 184 can be representative of a plurality of issuer data store 184, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the issuer data store 184 is associated with the operation of the various applications or functional entities described below. This data can include an issuer public key 172, an issuer private key 165, and potentially other data.

The issuer public key 172 and the issuer private key 165 can correspond to a public-private key pair controlled by an entity associated with the issuer service 159 and the issuer computing environment 109. The key-pair can be generated using various approaches, such as elliptic curve cryptography (ECC) approaches or using approaches based at least in part on the Rivest-Shamir-Adleman (RSA) algorithm. In various examples, the issuer public key 172 is publicly available. The issuer private key 165 remains stored in the issuer data store 184 and can be used to sign VCs 136 issued by the issuer service 159 that represent the attribute of a given subject and/or delegated linkages between one or more DIDs 133 and/or VCs 136.

The distributed identity ledger 115 represents synchronized, eventually consistent, data stores spread across multiple nodes in different geographic or network locations. Each node in the distributed identity ledger 115 can contain a replicated copy of the distributed identity ledger 115, including all data stored in the distributed identity ledger 115. Records of transactions involving the distributed identity ledger 115 can be shared or replicated using a peer-to-peer network connecting the individual nodes that form the distributed identity ledger 115. Once a transaction or record is recorded in the distributed identity ledger 115, it can be replicated across the peer-to-peer network until the record is eventually recorded with all nodes. Various consensus methods can be used to ensure that data is written reliably to the distributed identity ledger 115. In some implementations, data, once written to the distributed identity ledger 115, is immutable. Examples of a distributed data store that can be used for the distributed identity ledger 115 can include various types of blockchains, distributed hash tables (DHTs), and similar data structures. Various data can be stored in the distributed identity ledger 115. For example, the distributed identity ledger 115 can include DIDs 133 associated with subjects and a revocation registration registry 139.

A DID 133 corresponds to an identifier that enables verifiable, decentralized digital identity of a subject (e.g., person, organization, thing, etc.). In various examples, a DID 113 can correspond to an address to a DID document 153 that includes information associated with the subject. For example, the DID document 153 can comprise a set of data describing the subject and can include various information (e.g., cryptographic keys) that can used to authenticate the subject. In various examples, the DID document 153 can include an address or pathway for accessing a wallet service 156 associated with the subject. The revocation registry 139 stored in the distributed identity ledger 115 can be updated to indicate that a corresponding credential or DID 133 has been revoked. In various examples, the DID 133, the DID document 153, and the revocation registry 139 can be implemented using various standards, such as the World Wide Web Consortium's (W3C's) Decentralized Identifier (DID) standard.

The client device 112 is representative of a plurality of client devices that can be coupled to the network 118. The client device 112 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 112 can include one or more displays 181, such as liquid crystal displays (LCDs), gas plasma-based flat panel displays, organic light emitting diode (OLED) displays, electrophoretic ink ("E-ink") displays, projectors, or other types of display devices. In some instances, the display 181 can be a component of the client device 112 or can be connected to the client device 112 through a wired or wireless connection.

The client device 112 can be configured to execute various applications such as a client application 178, a wallet service 156, or other applications. The client application 178 can be executed in a client device 112 to access network content served up by the linkage computing environment 103, the verifier computing environment 106, the issuer computing environment 109, or other servers, thereby rendering a user interface 151 on the display 181. To this end, the client application 178 can include a browser, a dedicated application, or other executable, and the user interface 151 can include a network page, an application screen, or other user mechanism for obtaining user input. The client device 112 can be configured to execute applications beyond the client application 178 such as email applications, social networking applications, word processors, spreadsheets, or other applications.

The wallet service 156 can be executed to communicate with the linkage computing environment 103, the verifier computing environment 106, the issuer computing environment 109, the distributed identity ledger 115 and other systems in response to initiation of an identity verification process and/or a communication session. In various examples, the wallet service 156 can be executed to generate DID data 187 comprising decentralized identifiers (DIDS) 133. In various examples, the wallet service 156 can store verifiable credentials 136 associated with user of the client device 112 and issued by a trusted third party (e.g., issuer entity, linkage entity, etc.) in the wallet 190 of the user.

The wallet service 156 can store and access the DID data 187 and verifiable credentials 136 from a corresponding wallet 190. In various examples, the wallet 190 corresponds to a digital identity wallet for securely storing the DID data 187, verifiable credentials 136, and storing the private keys (not shown) associated with one or more DIDs 133 created for the given user. The wallet 190 can comprise a hard wallet or a soft wallet. Although the wallet 190 is illustrated in FIG. 1 as being part of the client device 112, it is understood that the wallet 190 can comprise a separate storage device that can be attached to or otherwise communicatively coupled to the client device 112. In various examples, access to the wallet 190 can require a passcode that is provided by a user to the wallet service 156 and/or the client application 178 to access the wallet 190. For example, the wallet service 156 and/or the client application 178 generates and renders a pop-up box or other type of user interface component requesting the user enter a particular passcode. The passcode can comprise a numeric sequence of numbers (e.g., four to six digits) that is provided by the user. Upon receiving a matching access code, the wallet service 156 and/or the client application 178 can access the DID data 187 stored on the wallet 190.

The DID data 187 included in the wallet 190 and generated by the wallet service 156 can include one or more DIDs 133 and corresponding key-pairs. A DID 133 corresponds to an identifier that enables verifiable, decentralized digital identity of a subject (e.g., person, organization, thing, etc.). In various examples, a DID 133 can correspond to an address to a DID document 153 that includes information associated with the subject and is stored in the distributed identity ledger 115. A DID 133 can used by an individual to assert his or her identity to others and may be stored in the identity ledger 122 to allow others to verify the individual's identity. A DID 133 can further be used by an individual to assert a delegated relationship with another entity. Accordingly, in some implementations, the DID 133 can include a public key of a public-private key pair controlled by the individual. A DID 133 can be implemented using a variety of approaches, such as the World Wide Web Consortium's (W3C's) Decentralized Identifier (DID) standard.

In various examples, a verifiable credential 136 corresponds to a digital credential used to identify an attribute (e.g., qualification, component, authority, achievement, personally quality, delegated linkages or relationships etc.) associated with the credential holder. For example, the verifiable credential 136 can be associated with a user by being linked with and/or otherwise associated with the DID 133 of the user. The verifiable credential 136 can include information represented by a physical credential (e.g., passport, driver's license, birth certificate, etc.) or a non-physical credential (e.g., bank account ownership, etc.) that identifies one or more attributes associated with the user.

Figure 2:
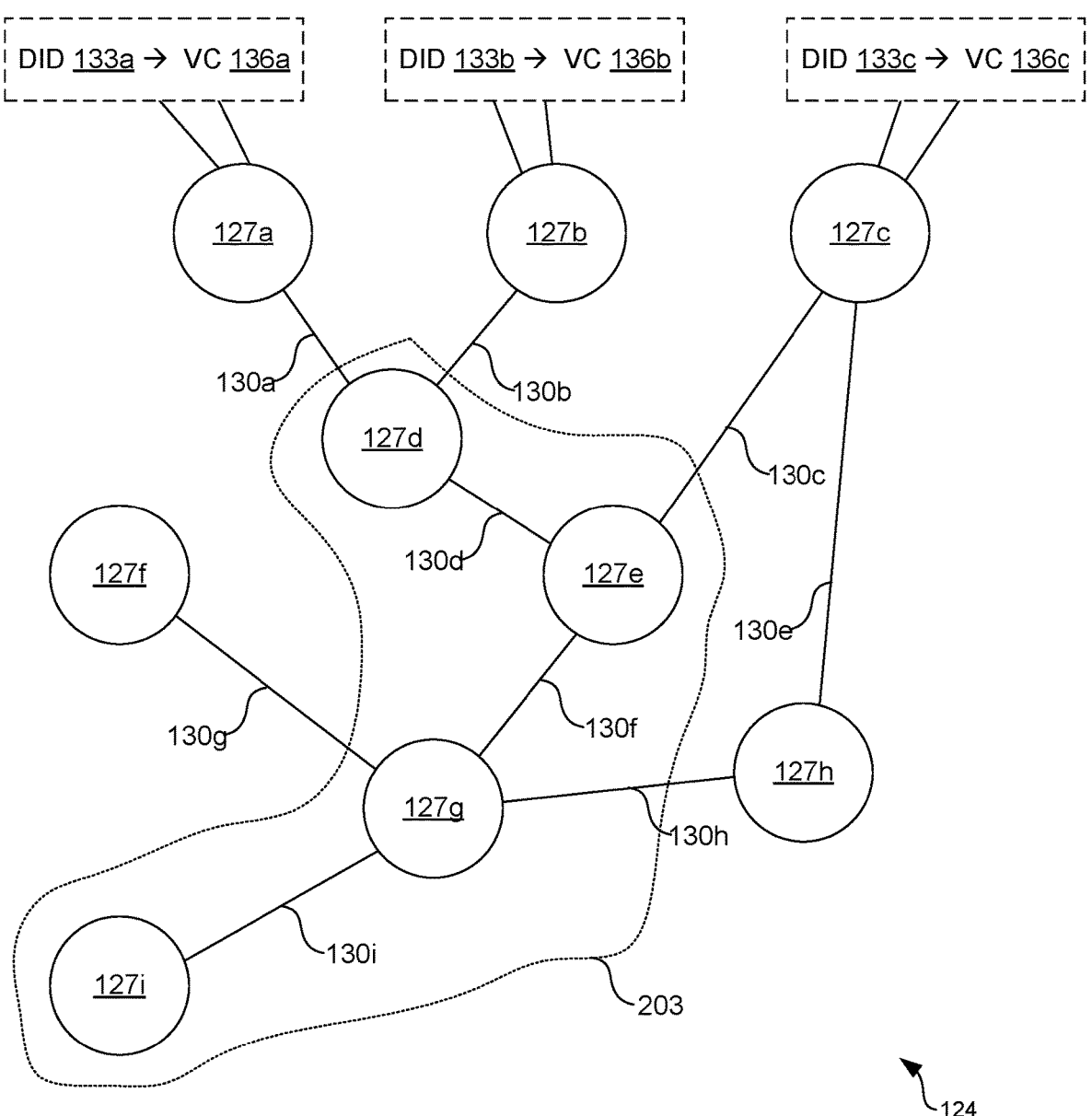
FIG. 2 is a pictorial diagram of a decentralized identifier (DID) tree graph that represents relationships between verifiable credentials (VCs) associated with DIDs between one or more entities according to various embodiments of the present disclosure.

Next, a general description of the operation of the various components of the network environment 100 is provided with reference to FIGS. To begin, FIG. 2 illustrates an example visual representation of a DID tree graph 124 comprising nodes 127 (e.g., 127*a*, 127*b*, 127*c*, 127*d*, 127*e*, 127*f*, 127*g*, 127*h*, 127*i*) and edges 130 (e.g., 130*a*, 130*b*, 130*c*, 130*d*, 130*e*, 130*f*, 130*g*, 130*h*, 130*i*). A node 127 corresponds to a DID 133 representing an entity and being associated with a VC 136 of the entity. An edge corresponds to a DID 133 of a VC 136 that represents a relationship between the DIDs 133 of the nodes 127 that a given edge 130 is connecting. For example, node 127*a* represents DID 133*a* which is related to VC 136*a*. Similarly, node 127*b* represents DID 133*b* which is related to VC 136*b* and node 127*c* represents DID 133*c* which is related to VC 136*c*. In addition, edge 130*a* connects node 127*a* to 127*d* and corresponds to a DID 133 and VC 136 that represent the linkage or relationship between the DID 133 and VC 136 of node 127*a* and the DID 133 and VC 136 of node 127*d*. In various examples, the DID tree graph 124 is associated with a graph database (e.g., Neo4j, AWS Neptune, ArangoDB, Janus-Graph, Dgraph, etc.).

Further illustrated in FIG. 2 is a DID subtree 203 of the DID tree graph 124. In this example, the DID subtree 203 includes nodes 127*d*, 127*e*, 127*g*, and 127*i* and edges 130*d*, 130*f*, and 130*i*. In various examples, the DID subtree 203 can be associated with a DID 133 of a VC 136 that is associated with the given DID subtree 203. In some examples, the DID 133 corresponds to a root DID 133 of the DID tree graph 124 and the verifier service 142 can identify the subtree of the DID tree graph 124 by identifying any nodes 127 and/or edges 130 that descend from the root DID 133 of the DID tree graph 124. For example, the root DID 133 can correspond to node 127*d* and the descendent DIDs 133 can correspond to nodes 127*e*, 127*g*, and 127*i* and edges 130*d*, 130*f*, and 130*i*.

In other examples, the defined DID subtree 203 can be defined in the claims of a VC 136 issued to represent the DID subtree 203 and can be identified based at least in part on the corresponding DID 133. For example, the graph properties 145 can include a mapping of the DID 133 to nodes 127 and edges 133 associated with a given subtree 203 of the DID tree graph 124. Accordingly, the linkage service 121 can identify the given subtree 203 based at least in part on the nodes 127 and edges 133 that are mapped to the DID 133 in the graph properties 145.

Figure 3A:
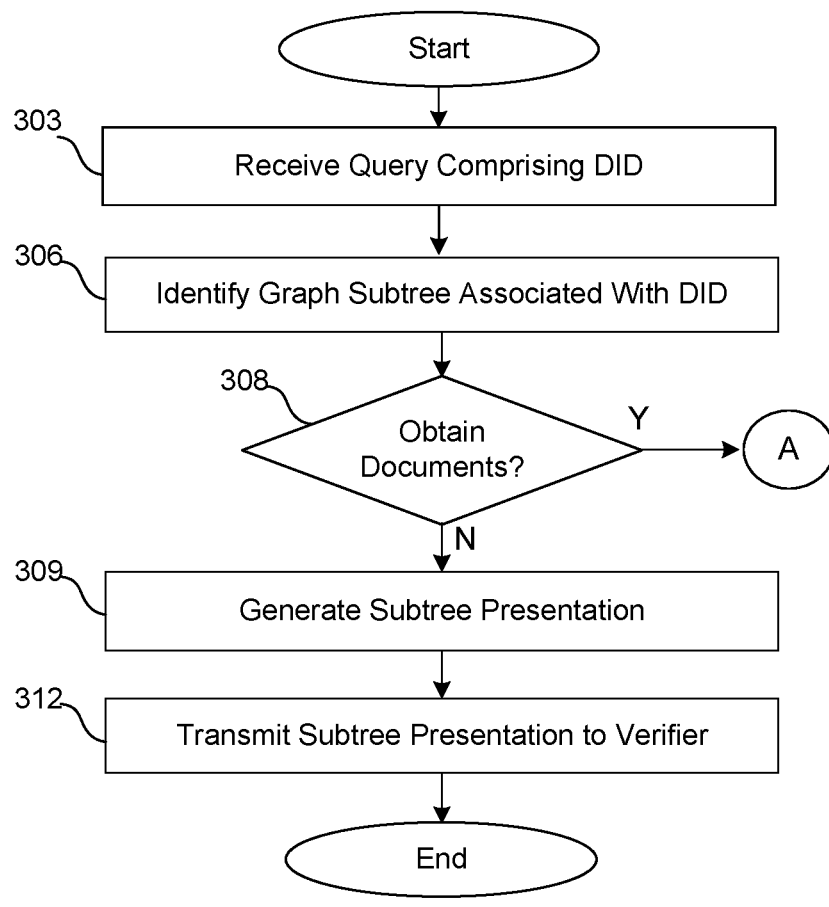
FIGS. 3A, 3B, 4 and 5 are flowcharts illustrating examples of functionality implemented as portions of an application executed in a linkage computing environment of the network environment of FIG. 1 according to various embodiments of the present disclosure.
Figure 3B:
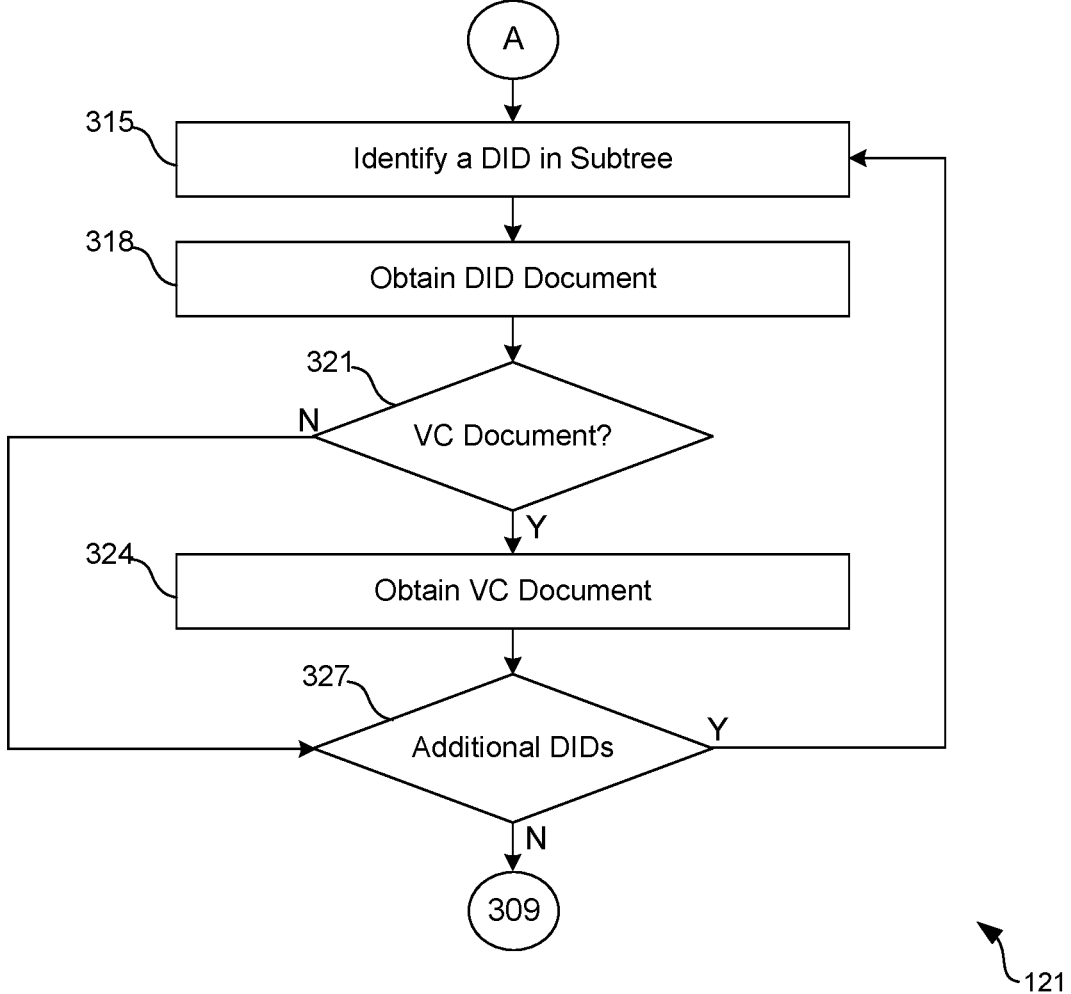

Referring next to FIGS. 3A and 3B, shown is a flowchart that provides one example of the operation of a portion of the linkage service 121. The flowchart of FIGS. 3A and 3B provides merely an example of the many different types of functional arrangements that can be employed to implement the operation of the depicted portion of the linkage service 121. As an alternative, the flowchart of FIGS. 3A and 3B can be viewed as depicting an example of elements of a method implemented within the network environment 100.

Beginning with block 303, the linkage service 121 receives a query comprising a DID 133. For example, a verifier service 142 executing in the verifier computing environment 106 can send a query to the linkage service 121 requesting information about a portion of a DID tree graph 124 managed by the linkage service 121 that corresponds to a given DID 133. For example, the verifier service 142 can submit a query including a DID 133 associated with a VC 136 that has been submitted to the verifier service 142 for verification. In various examples, the VC 136 can be issued to represent linkages or relationships between one or more DIDs 133 of the DID tree graph 124. For example, the VC 136 can represent a subtree 203 of the DID tree graph 124.

At block 306, the linkage service 121 identifies a graph subtree 203 associated with the DID 133 in the query. In some examples, the DID 133 corresponds to a root DID 133 of the DID tree graph 124 and the verifier service 142 can identify the subtree 203 of the DID tree graph 124 by identifying any nodes 127 and/or edges 130 that descend from the root DID 133 of the DID tree graph 124. In other examples, the DID 133 corresponds to a DID 133 associated with a defined subtree 203 including one more nodes 127 and edges 130 in the DID tree graph 124. For example, the graph properties 145 can include a mapping of the DID 133 to nodes 127 and edges 130 associated with a given subtree 203 of the DID tree graph 124. Accordingly, the linkage service 121 can identify the given subtree 203 based at least in part on the nodes 127 and edges 130 that are mapped to the DID 133 in the graph properties 145.

At block 308, the linkage service 121 determines whether DID documents 153 are to be obtained. In some examples, the query can define properties associated with what the linkage service 121 is to provide to the querying entity. For example, the query can request the corresponding DID documents 153 associated with the DIDs 133 of the DID subtree 203 and/or any copies of physical credentials associated with the VC 136 of the DID 133. If the linkage service 121 is to obtain the documents, the linkage service 121 proceeds to block 315 shown in FIG. 3B. Otherwise, the process proceeds to block 309.

At block 309, the linkage service 121 generates a DID subtree presentation 148. In some examples, the graph subtree presentation 148 is generated to convert the properties of the DID tree graph 124 into a format that can be understood and compatible with the requesting entity. In some examples, the graph subtree presentation 148 can comprise an array of DIDs 133 represented by the identified DID subtree 203. In some examples, the graph subtree presentation 148 can comprise a user interface 151 that includes a visual representation of the DID subtree 203. In this example, the user interface 151 can include selectable components corresponding to each of the nodes 127 and edges 130 of the graph subtree. Each of the selectable components, upon selection, can provide a DID 133, a DID document 153, and/or a VC document that is represented by the VC of the associated DID 133.

In some examples, as discussed with reference to blocks 315-327 of FIG. 3B, the linkage service 121 can obtain a corresponding DID document 153 and/or VC document associated with the DIDs 133 of one or more of the nodes 127 and/or edges 130 of the DID subtree 203. For example, for one or more of the DIDs 133 in the DID subtree, the linkage service 121 can obtain a corresponding DID document 153 from the distributed identity ledger 115 and include the corresponding DID document 153 in the graph subtree presentation 148. In various examples, the linkage service 121 can obtain a corresponding VC document associated with the DID 133 of a given node 127. The linkage service 121 can further include the VC document in the graph subtree presentation 148 in association with the corresponding DID 133.

At block 312, the linkage service 121 transmits the graph subtree presentation 148 to the verifier service 142 (or other querying entity) for verification. The graph subtree presentation 148 is transmitted to the verifier service 142 in response to the query received in block 303. Thereafter, this portion of the process proceeds to completion.

Returning to block 308, if the linkage service 121 is to obtain the documents, the linkage service 121 proceeds to block 315 shown in FIG. 3B. At block 315, the linkage service 121 identifies a DID 133 in the DID subtree 203. As discussed, each node 127 and edge 130 of the DID subtree 203 corresponds to a DID 133 and associated VC 136. Accordingly, in various examples, the linkage service 121 can identify a DID 133 by traversing the graph DID subtree 203.

At block 318, the linkage service 121 obtains the DID document 153 associated with the DID 133. For example, the linkage service 121 can query the distributed identity ledger 155 for the corresponding DID document 153. The DID document 153 includes information associated with the subject associated with the DID 133. For example, the DID document 153 can comprise a set of data describing the subject and can include various information (e.g., cryptographic keys) that can used to authenticate the subject. In various examples, the DID document 153 can include an address or pathway for accessing a wallet service 156 associated with the subject.

At block 321, the linkage service 121 determines whether to obtain a VC document associated with the VC 136 and DID 133. The VC document can include a copy of a physical credential represented by the VC 136. The linkage service 121 can determine whether to obtain a VC document based at least in part on one or more factors including, whether a VC document exists for the VC 136, configuration data associated with the VC, permissions included in the DID document 153, parameters set forth in the query received from the verifier service 142, and/or other factors. If a VC document is to be obtained, the linkage service 121 proceeds to block 324. Otherwise, the linkage service 121 proceeds to block 327.

At block 324, the linkage service 121 obtains the VC document. For example, the linkage service 121 can obtain the corresponding DID document 153 and request access to the VC document represented by the VC via interactions with the VCs holder's agent (e.g., wallet service 156). In various examples, the corresponding DID document 153 can comprise a uniform resource locator (URL) or other location address or application programming interface (API) call for communicating with the VC holder's agent thereby allowing the linkage service 121 to request the VC document represented by the VC 136.

At block 327, the linkage service 121 determines whether there are additional DIDs 133 in the DID subtree 203. If there are additional DIDs 133, the linkage service 121 returns to block 315. Otherwise, the linkage service 121 returns to block 309 in FIG. 3A.

Figure 4:
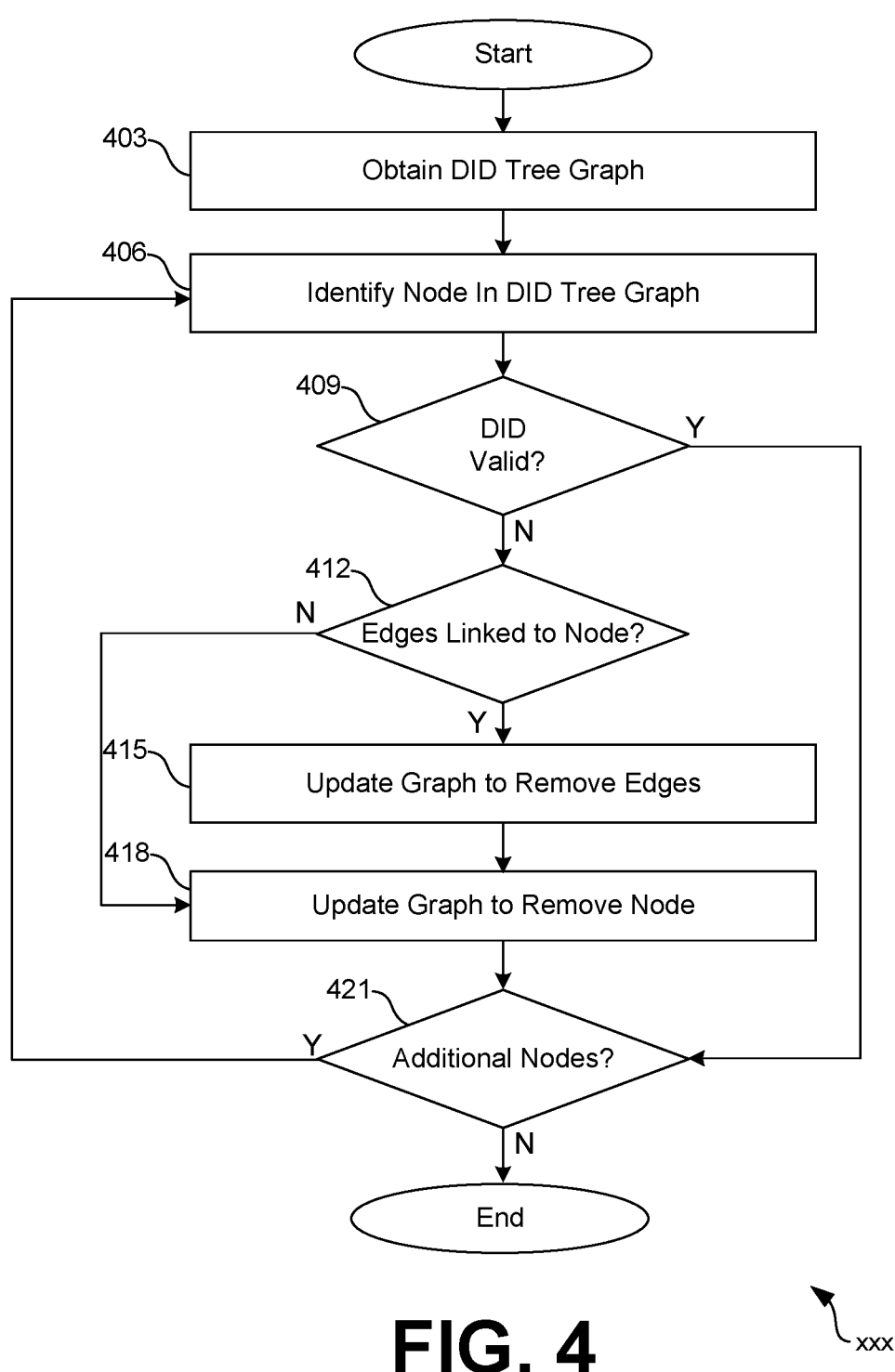

Referring next to FIG. 4, shown is a flowchart that provides one example of the operation of a portion of the linkage service 121. The flowchart of FIG. 4 provides merely an example of the many different types of functional arrangements that can be employed to implement the operation of the depicted portion of the linkage service 121. As an alternative, the flowchart of FIG. 4 can be viewed as depicting an example of elements of a method implemented within the network environment 100. FIG. 4 relates to an example of how the linkage service 121 maintains the DID tree graph 124 by verifying that the DIDs 133 of the DID tree graph 124 are valid and not revoked.

Beginning with block 403, the linkage service 121 obtains a DID tree graph 124. For example, the linkage service 121 can obtain the DID tree graph 124 from the linkage data store 175 in the linkage computing environment 103. In various examples, the DID tree graph 124 is associated with a graph database (e.g., Neo4j, AWS Neptune, ArangoDB, JanusGraph, Dgraph, etc.) and obtaining the DID tree graph 124 comprises interacting with the graph database in accordance the application programming interface (API) calls or protocols. According to various examples, a DID tree graph 124 represents the relationships and linkages between VCs 136 associated with one or more entities. For example, a DID tree graph 124 can be represented by nodes 127 and edges 130. A node 127 corresponds to a DID 133 representing an entity and being associated with a VC 136 of the entity. An edge corresponds to a DID 133 of a VC 136 that represents a relationship between the DIDs 133 of the nodes 127 that a given edge 130 is connecting.

At block 406, the linkage service 121 identifies a node 127 in the DID tree graph 124. In various examples, the linkage service 121 can identify a node 127 by traversing the DID tree graph 124. In some examples, the node 127 comprises a root node 127 of the DID tree graph 124. In other examples, the node 127 comprises a descendent node 127 of the root node 127 connect via one or more edge 130 and/or nodes 127.

At block 409, the linkage service 121 determines if the DID 133 associated with the node 127 is valid. In various examples, the linkage service 121 can query the revocation registry 139 to determine whether the corresponding DID 133 has been revoked. If the DID 133 has not been revoked, the linkage service 121 proceeds to block 421. Otherwise, the linkage service 121 proceeds to block 412.

At block 412, the linkage service 121 determines if there are any edges 130 connected to the node 127 of the invalid DID 133. If there are edges 130 connected to the node 127, the linkage service 121 proceeds to block 415. Otherwise, the linkage service 121 proceeds to block 418.

At block 415, the linkage service 121 updates the DID tree graph 124 to remove the identified edges 130. By removing the identified edges 130, the linkage service 121 ensures that the DID tree graph 124 is up-to-date to reflect the invalid or otherwise revoked DID 133. At block 418, the linkage service 121 updates the DID tree graph 124 to remove the node 127 associated with the invalid or otherwise revoked DID 133. By removing the node 127, the linkage service 121 ensures that the DID tree graph 124 is up-to-date to reflect the invalid or otherwise revoked DID 133.

At block 421, the linkage service 121 determines if there are any additional nodes 127 in the DID tree graph 124. If there are additional nodes 127, the linkage service 121 returns to block 406. If there are no additional nodes 127 in the DID tree graph, this portion of the process proceeds to completion.

Figures 5, 6:
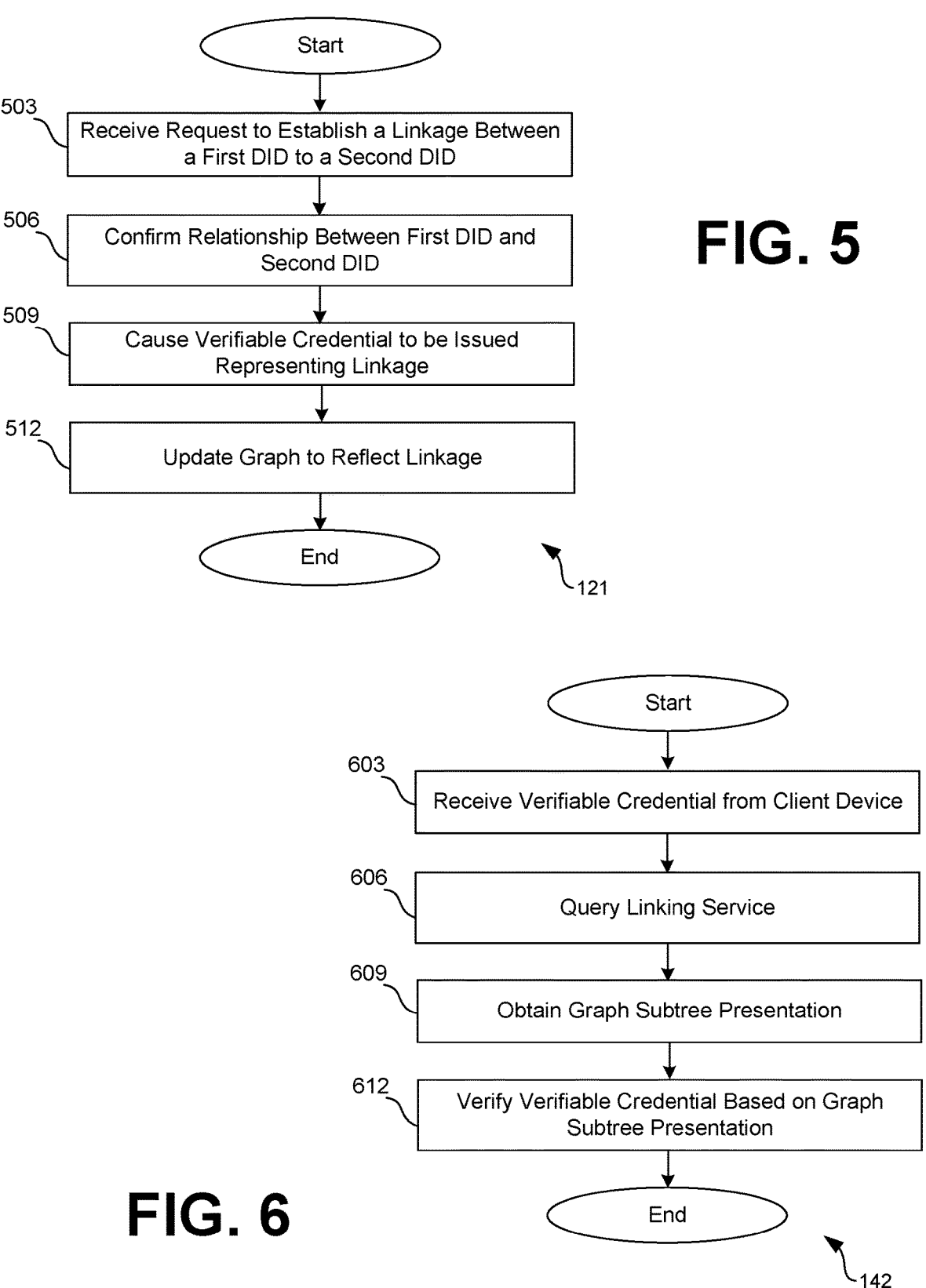
FIG. 6 is a flowchart illustrating an example of functionality implemented as portions of an application executed in a verifier computing environment of the network environment of FIG. 1 according to various embodiments of the present disclosure.

Referring next to FIG. 5, shown is a flowchart that provides one example of the operation of a portion of the linkage service 121. The flowchart of FIG. 5 provides merely an example of the many different types of functional arrangements that can be employed to implement the operation of the depicted portion of the linkage service 121. As an alternative, the flowchart of FIG. 5 can be viewed as depicting an example of elements of a method implemented within the network environment 100.

Beginning with block 503, the linkage service 121 obtains a request to establish a linkage between a first DID 133 and a second DID 133. In various examples, a user associated with the first DID 133 and/or the second DID 133 can interact with a user interface 151 served up by the linkage service 121. Through the user interactions, the user can define or otherwise request the establishment of a linkage or relationship between the first DID 133 and/or the second DID 133. In various examples, the linkage can be associated with the delegation of rights or other type of permission with regard to VCs 136. As such, the first DID 133 can correspond to a first VC 136 and the second DID 133 can correspond to a second VC 136.

At block 506, the linkage service 121 confirms a relationship between the first DID 133 and/or the second DID 133. For example, the linkage service 121 can contact the entities associated with the first DID 133 and the second DID 133 to requesting that entities verify or provide proof (or a proof) that the relationship exists. In some examples, the linkage service 121 can request that a trusted third party entity confirm the relationship between the entities of the first DID 133 and the second DID 133.

At block 509, the linkage service 121 causes a VC 136 to be issued representing the established linkages between the first DID 133 and the second DID 133. In some examples, the linkage service 121 issues the VC 136. In other examples, the linkage service 121 requests that a trusted third party entity (e.g., issuer entity of issuer computing environment 109) issues the VC 136. In various examples, the linkage service 121 or trusted third party entity (e.g., issuer entity of issuer computing environment 109) can generate a DID 133 associated with the relationship being established. Using the created DID 133, a VC 136 can be issued to represent the relationship or linkage. In various examples, the claims of the issued VC 136 can include a description of the linkage, the graph subtree 203 associated with the linkage, and/or other representation of the linkage. In addition, the VC 136 can be signed with the private key (e.g., linkage private key 162, issuer private key 165) of the issuing entity and the corresponding DID document 153 associated with the DID 130 of the VC 136 can include the corresponding public key (e.g., linkage public key 168, issuer public key 172) of the issuing entity for verification purposes.

At block 512, the linkage service 121 updates the DID tree graph 124 to reflect the linkage. In some examples, the linkage corresponds to an edge 130 that connects two nodes 127 related to the first DID 133 and the second DID 133. Accordingly, the DID tree graph 124 is updated to reflect the addition of the edge 130. In other examples, the linkage corresponds to a graph subtree 203 of multiple nodes 127 and edges 130. In this example, the graph properties 145 of the DID tree graph 124 can be updated to include a mapping of the DID 133 associated with the generated VC 136 and the nodes 127 and/or edges 130 of the DID subtree 203 associated with the VC 136 and established linkage or relationship. Thereafter, this portion of the process proceeds to completion.

Referring next to FIG. 6, shown is a flowchart that provides one example of the operation of a portion of the verifier service 142. The flowchart of FIG. 6 provides merely an example of the many different types of functional arrangements that can be employed to implement the operation of the depicted portion of the verifier service 142. As an alternative, the flowchart of FIG. 6 can be viewed as depicting an example of elements of a method implemented within the network environment 100.

Beginning with block 603, the verifier service 142 receives a VC 136 associated with an entity from a client device 112 of the entity. For example, the VC 136 corresponds to a digital credential used to identify an attribute (e.g., qualification, component, authority, achievement, personally quality, etc.) associated with the credential holder. The VC 136 can be presented to the verifier service 142 for verification. In some examples, the VC 136 represents linkages or relationships between one or more VCs 136 and corresponding DIDs 133.

At block 606, the verifier service 142 queries the linkage service 121 to obtain the linked or otherwise related DIDs 133 represented by the VC 136. In various examples, the verifier service 142 extracts a DID 133 from the received VC 136 and submits a query to the linkage service 121 with the extracted DID 133. The query can further include parameters associated with the query and what is to be returned to the verifier service 142.

At block 609, the verifier service 142 obtains a graphs subtree presentation 148 from the linkage service 121. In some examples, the graph subtree presentation 148 is generated to convert the properties of the DID tree graph 124 into a format that can be understood and compatible with the requesting entity. In some examples, the graph subtree presentation 148 can comprise an array of DIDs 133 represented by the identified DID subtree 203. In some examples, the graph subtree presentation 148 can comprise a user interface 151 that includes a visual representation of the DID subtree 203. In this example, the user interface 151 can include selectable components corresponding to each of the nodes 127 and edges 130 of the graph subtree. Each of the selectable components, upon selection, can provide a DID 133, a DID document 153, and/or a VC document that is represented by the VC of the associated DID 133.

At block 612, the verifier service 142 verifies the VC 136 based at least in part on the graph subtree presentation 148. For example, the verifier service 142 can traverse the corresponding DID subtree 203 included in the graph subtree presentation 148 and verify the signatures associated with each VC 136 of the nodes 127 and edges 130 of the DID subtree 203. In some cases, the claim from each verifiable credential 136 can be presented in response to a proof request, and in other cases, a Zero Knowledge Proof (ZKP; e.g., zk-SNARKs) can be involved that demonstrates a claim is true, without presenting the actual data behind the proof. If the corresponding VCs 136 and DIDs 133 are verified, the verifier service 142 can verify the presented VC 136. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103, 106, 109.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive, from a verifier device, a query comprising a decentralized identifier (DID) associated with a verifiable credential;
identify a graph subtree associated with the DID, the graph subtree being included in a graph database comprising a plurality of nodes and a plurality of edges representing relationships between a plurality of DIDs;
generate a graph subtree presentation associated with the graph subtree;
transmit the graph subtree presentation to the verifier device in response to the query;
receive a cryptographic challenge associated with an edge in the graph subtree;
create a signed cryptographic challenge by using a linkage private key to sign the cryptographic challenge; and
return the signed cryptographic challenge.

2. The system of claim 1, wherein the plurality of DIDs comprise a plurality of user DIDs and a plurality of linkage DIDs, individual nodes correspond to a respective user DID of the plurality of user DIDs, and individual edges correspond to a respective linkage DID of the plurality of linkage DIDs, the respective linkage DID being associated with a linkage between a first respective user DID and a second respective user DID.

3. The system of claim 2, wherein the machine-readable instructions further cause the computing device to at least:
identify a respective DID of the plurality of DIDs included in the graph subtree; and
obtain a respective DID document associated with the respective DID from a distributed identity ledger,
the graph subtree presentation including the respective DID document in association with the respective DID.

4. The system of claim 2, wherein the verifiable credential comprises a first verifiable credential and the respective DID is associated with a second verifiable credential, and wherein the machine-readable instructions further cause the computing device to at least:
obtain a verifiable credential document represented by the second verifiable credential, the graph subtree presentation including the verifiable credential document.

5. The system of claim 1, wherein, when executed, the machine-readable instructions cause the computing device to at least update the graph database based at least in part on a respective status of a respective DID of the plurality of DIDs of the graph database.

6. The system of claim 5, wherein, when executed, the machine-readable instructions cause the computing device to at least:
determine that the respective DID from the plurality of DIDs has been revoked based at least in part on a review of a revocation list in a distributed identity ledger, the graph database being updated based at least in part on the respective DID being revoked.

7. The system of claim 1, wherein the verifiable credential represents a verified relationship between a plurality of subtree DIDs of the plurality of DIDs included in the graph subtree, the graph subtree comprising a first node associated with a first DID, a second node associated with a second DID and a first edge associated with a third DID associated with a link between the first DID and the second DID.

8. A method, comprising:

receiving a verifiable credential associated with a user, the verifiable credential being received for verification;

extract a root decentralized identifier (DID) from the verifiable credential;

query a linkage service to obtain a graph subtree presentation identifying a plurality of related DIDs associated with the root DID;

verify the verifiable credential based at least in part on a verification of the plurality of related DIDs included in the graph subtree presentation;

send a cryptographic challenge associated with an edge in the graph subtree presentation to the linkage service; and receive a signed cryptographic challenge from the linkage service created by signing the cryptographic challenge with a linkage private key.

9. The method of claim 8, wherein the graph subtree presentation identifying the plurality of related DIDs is represented by least in part on a plurality of nodes and a plurality of edges included in a graph database, the plurality of nodes corresponding to a plurality of user DIDs of the plurality of related DIDs and the plurality of edges corresponding to a plurality of linkage DIDs of the plurality of related DIDs.

10. The method of claim 8, wherein verifying the verifiable credential comprises traversing the graph subtree presentation and verifying a plurality of related verifiable credentials associated with the plurality of related DIDs.

11. The method of claim 8, wherein the graph subtree presentation comprises a plurality of DID documents associated with the plurality of related DIDs.

12. The method of claim 8, wherein graph subtree presentation comprises a plurality of related verifiable credential documents associated with the plurality of related DIDs.

13. The method of claim 8, wherein the verifiable credential comprises a first verifiable credential, verifying the first verifiable credential represents verifying that first verifiable credential is related to a second verifiable credential of a given related DID in the plurality of related DIDs of the graph subtree presentation.

14. The method of claim 8, wherein the linkage service manages a graph database representing one or more relationships between a plurality of DIDs comprising the plurality of related DIDs.

15. A non-transitory, computer-readable medium, comprising machine-readable instructions that, when executed by a processor of a computing device, cause the computing device to at least:

receive a request to establish a linkage between a first decentralized identifier (DID) and a second DID from a client device associated with a first user;

generate a verifiable credential (VC) associated with a third DID, the VC representing a relationship between the first DID and the second DID;

sign the VC with a linkage private key;

update a graph database to include the relationship between the first DID and the second DID; and transmit the VC to the client device.

16. The non-transitory, computer-readable medium of claim 15, wherein the machine-readable instructions cause the computer device to confirm the relationship between the first DID and the second DID.

17. The non-transitory, computer-readable medium of claim 15, wherein the client device comprises a first client device, and the machine-readable instructions, when executed by the processor, further cause the computing device to at least:

transmit a confirmation request to a second client device associated with a second user associated with the second DID requesting confirmation of the relationship between the first DID and the second DID; and receive a confirmation response from the second client device, the relationship being confirmed based at least in part on the confirmation request.

18. The non-transitory, computer-readable medium of claim 15, wherein the machine-readable instructions, when executed by the processor, further cause the computing device to at least:

receive a query comprising the third DID from a verifier device; and transmit a graph subtree presentation to the verifier device in response to the query.

19. The non-transitory, computer-readable medium of claim 18, wherein the machine-readable instructions, when executed by the processor, further cause the computing device to at least identify a subtree of DIDs from a graph database, the subtree of DIDs being identified based at least in part on the third DID included in the query, and the subtree of DIDs comprising the first DID and the second DID.

20. The non-transitory, computer-readable medium of claim 15, wherein the VC comprises a third VC associated with the third DID, the first DID is associated with a first VC, the second DID is associated with a second VC, and the third VC representing that the first user has been delegated access to the second VC associated with the second DID.

* * * * *